(12) United States Patent
Levecq et al.

(10) Patent No.: US 7,301,613 B2
(45) Date of Patent: Nov. 27, 2007

(54) DEVICE FOR ANALYSING A WAVEFRONT WITH ENHANCED RESOLUTION

(75) Inventors: Xavier Jean-François Levecq, Gif sur Yvette (FR); Fabrice Harms, Paris (FR)

(73) Assignee: Imagine Optic, Orsay (FR)

( * ) Notice: Subject to any disclaimer, the term of this patent is extended or adjusted under 35 U.S.C. 154(b) by 378 days.

(21) Appl. No.: 10/483,661

(22) PCT Filed: Jul. 12, 2002

(86) PCT No.: PCT/FR02/02495

§ 371 (c)(1),
(2), (4) Date: May 14, 2004

(87) PCT Pub. No.: WO03/006940

PCT Pub. Date: Jan. 23, 2003

(65) Prior Publication Data
US 2004/0196450 A1    Oct. 7, 2004

(30) Foreign Application Priority Data
Jul. 12, 2001    (FR) .................................. 01 09435

(51) Int. Cl.
*G01J 1/00*    (2006.01)
(52) U.S. Cl. ..................................... 356/121
(58) Field of Classification Search ............... 356/121; 351/205; 250/201.9
See application file for complete search history.

(56) References Cited

U.S. PATENT DOCUMENTS

| | | | |
|---|---|---|---|
| 4,725,138 A | 2/1988 | Wirth et al. | |
| 5,864,381 A | 1/1999 | Neal et al. | |
| 5,973,844 A | 10/1999 | Burger | |
| 6,376,819 B1 * | 4/2002 | Neal et al. | ............... 250/201.9 |
| 6,577,403 B1 * | 6/2003 | Primot et al. | ............... 356/521 |

FOREIGN PATENT DOCUMENTS

| | | |
|---|---|---|
| ES | 2 133 094 | 8/1999 |
| WO | WO 01 04591 | 1/2001 |

* cited by examiner

*Primary Examiner*—Gregory J. Toatley, Jr.
*Assistant Examiner*—Kara Geisel
(74) *Attorney, Agent, or Firm*—Young & Thompson

(57) ABSTRACT

A wavefront analysing device, of the Hartmann or Shack-Hartmann type, comprises in particular a set of sampling elements arranged in an analysis plane, and forming as many micro-lenses for sampling the incident wavefront, and a diffraction plane wherein are analysed the Airy discs of the different micro-lenses illuminated by the incident wavefront. The shape of each micro-lens is such that the associated diffraction figure has in the diffraction plane one or several preferential axe(s), and the microlenses are oriented in the analysis plane such that the preferential axe(s) of the diffraction figure of a micro-lens are offset relative to the preferential axes of the diffraction figures of neighbouring micro-lenses, thereby enabling to limit the overlapping of the diffraction figures.

18 Claims, 5 Drawing Sheets

Figure 2:
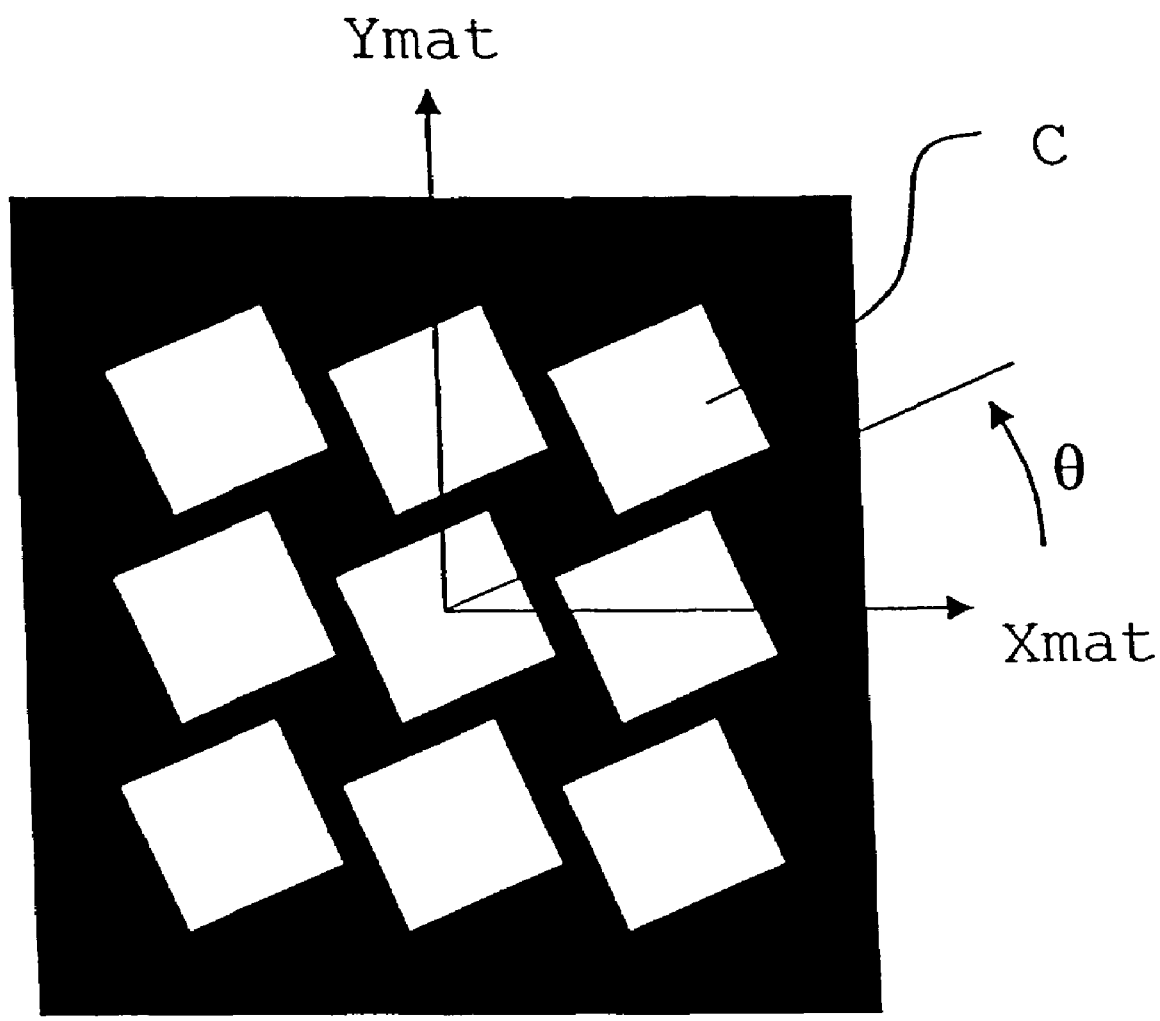

R
C
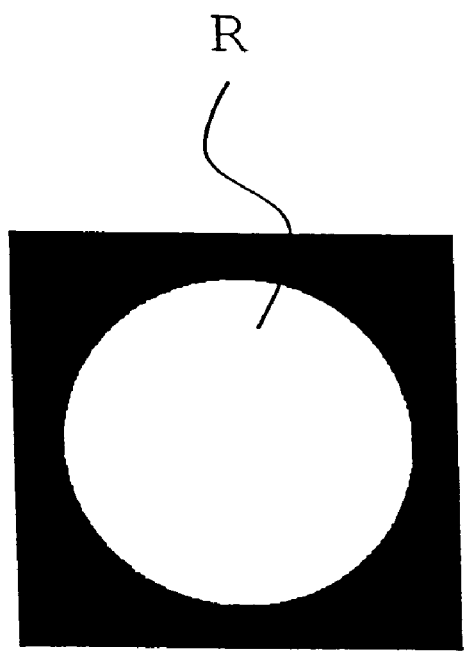
fig. 1A
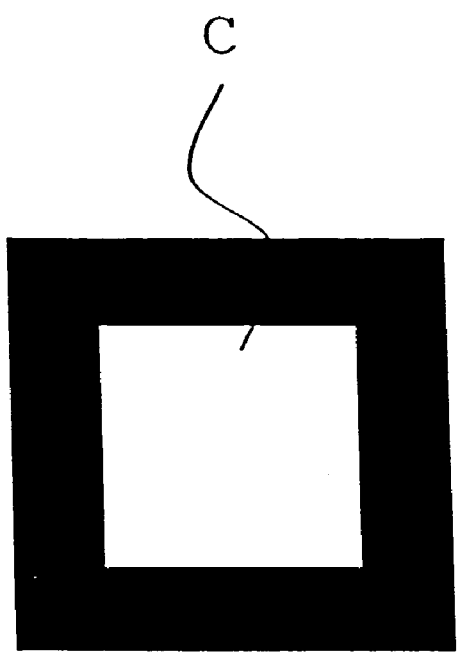
fig. 1B
FR
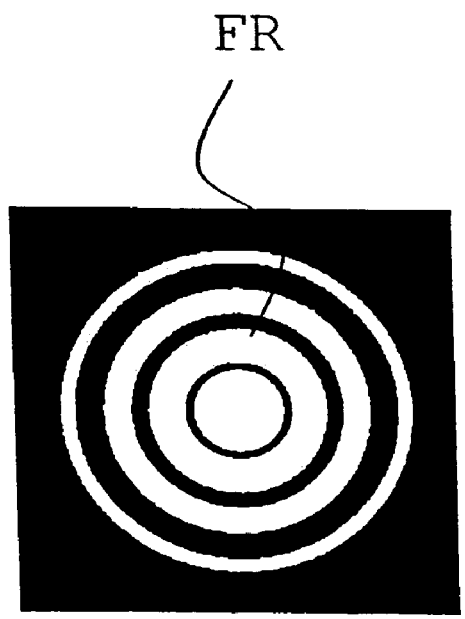
fig. 1C
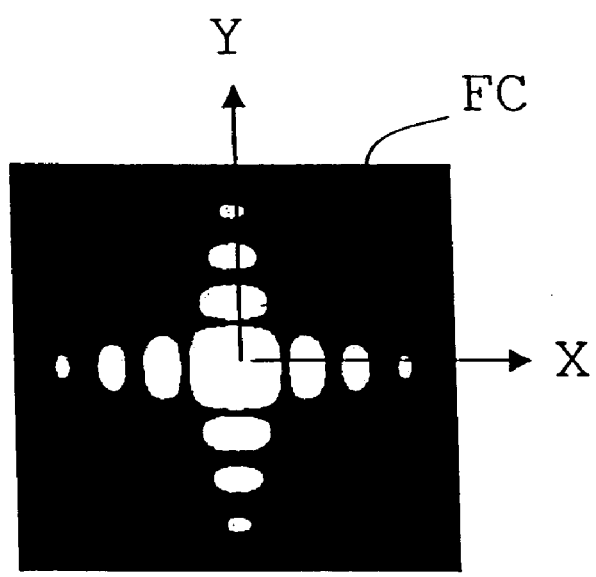
fig. 1D
figure 1

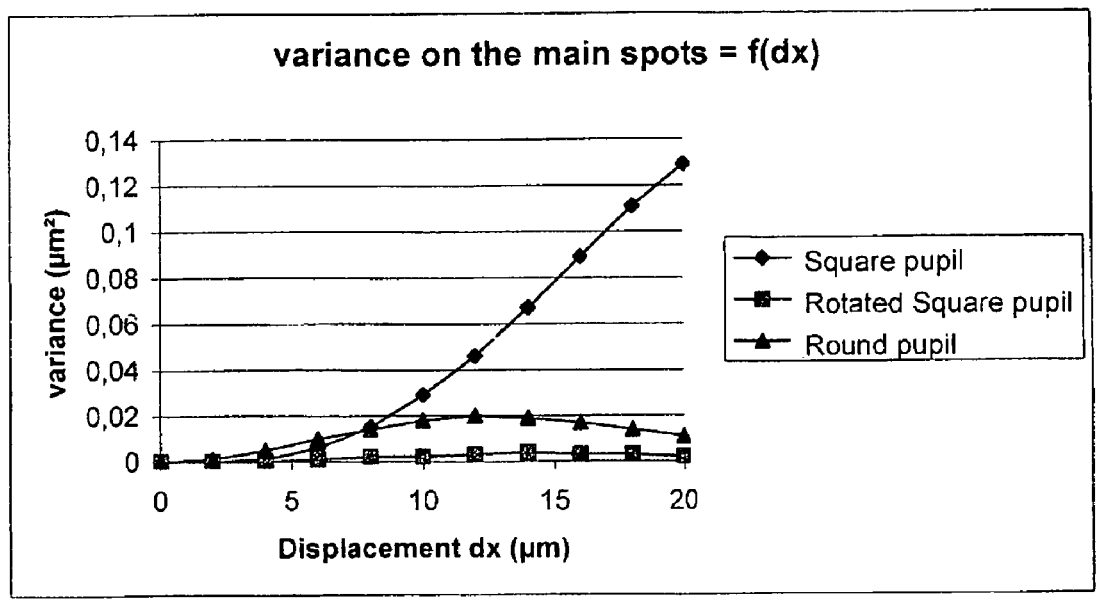
Figure 4A
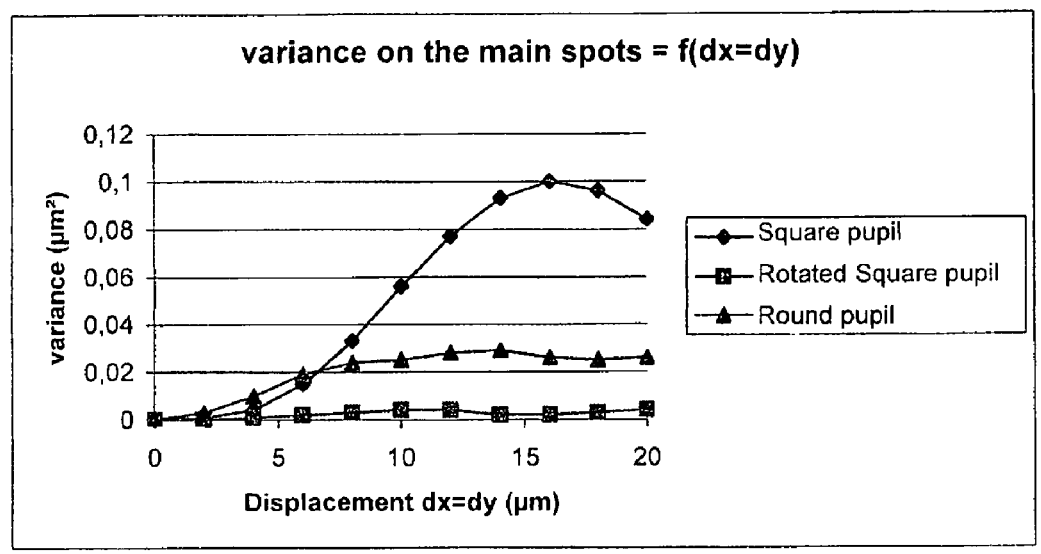
Figure 4B
Figure 4

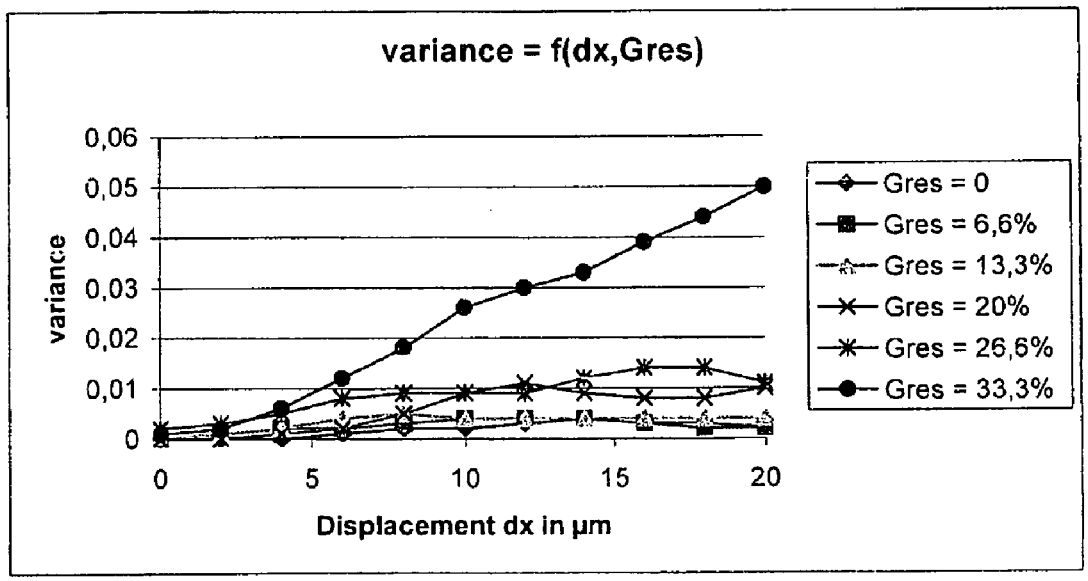
Figure 5A
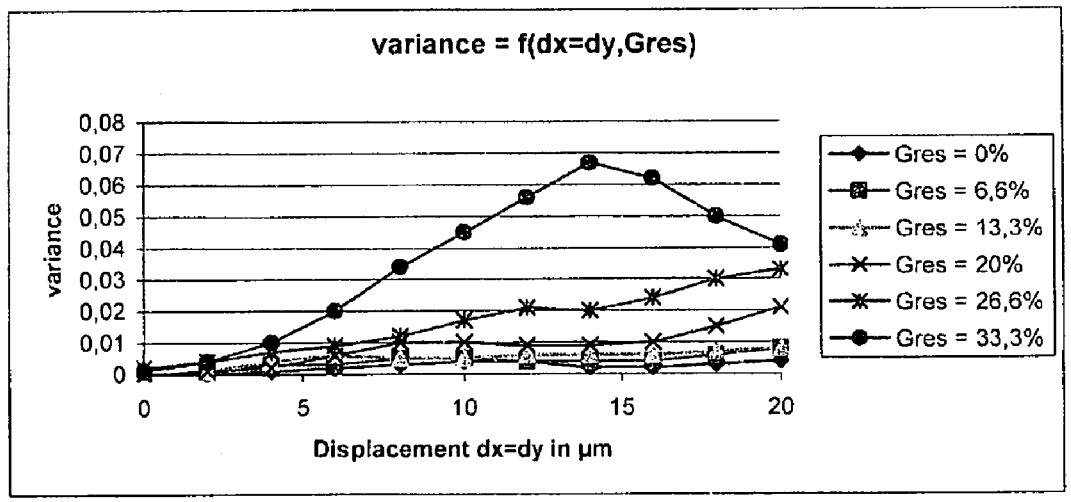
Figure 5B
Figure 5

DEVICE FOR ANALYSING A WAVEFRONT WITH ENHANCED RESOLUTION

This invention concerns the field of wavefront analysis using Hartman or Shack-Hartmann type methods.

Historically, the Hartmann method for analysing the wavefront introduces the concept of light sampling by a set of sampling elements with known characteristics and distribution, elements which are, originally, apertures in an opaque screen. The analysis of the light diffracted by the device enables to trace the shape of the surface of the starting wave, by knowing the positions of the spots on a pre-positioned screen in a plane called thereafter the diffraction plane.

Due to its design, the method needs, however, consequent light fluxes and Shack introduces, in particular to remedy this type of problem, the micro-lenses as light sampling elements.

Improvements in micro-optics, enabling to realise micro-lenses with very diverse characteristics, render this method particularly flexible: it finds therefore numerous applications in optical metrology.

Micro-lenses are sized conventionally with large focal lengths with respect to their dimensions, i.e. they are very slightly open, which exhibits numerous advantages: high sensitivity to variations of the local phase, spot sizes enabling to optimise calculation of their positions in particular when the screen is a CCD sensor, minimising aberrations introduced by these elements.

The micro-lenses thus sized operate most often in diffraction limit: each focussing spot corresponds to a diffraction figure which depends on the characteristics of the corresponding micro-lens, in particular its shape. A diffraction figure may extend sufficiently and overlap the neighbouring figure(s) in the diffraction plane, which introduces an error when calculating the position of the spots and hence the wave surface. In the case of coherent sources, this overlapping is accompanied by interference phenomena which are even more detrimental to the accuracy of measurement.

In order to enhance the resolution of the wavefront analysis device, it has been sought to increase the number of micro-lenses, and hence to reduce the size thereof, which translates by an increase in size of the diffraction figure and incurs overlapping risks of said figures, which may lead to an adverse effect.

One of the solutions to this problem consists in modifying the transmission of the micro-lenses used in order to obtain better localised diffraction figures, i.e. less spread and therefore less liable to overlap one another. It is the type of processing recommended for example in the international patent application WO 01/04591 A1, by manufacturing and using an apodisation mask at each sub-pupil. But the realisation of this type of mask, such as centring them at each of the sub-pupils, raises significant technological difficulties.

The solution presented here consists in modifying and optimising the geometrical arrangement of the sub-pupils used in the Shack-Hartman type analyser, for example, in order to limit the overlapping of the diffraction figures in the diffraction plane.

More precisely, the invention concerns a device for analysing a wavefront, of the Hartman or Shack-Hartmann type, comprising in particular a set of sampling elements arranged in an analysis plane, and forming as many sub-pupils for sampling the incident wavefront, and a diffraction plane wherein are analysed the diffraction spots of the different sub-pupils illuminated by the incident wavefront, characterised in that the shape of each sub-pupil is such that the associated diffraction figure has in the diffraction plane one or several preferential axes, and in that the sub-pupils are oriented in the analysis plane so that the preferential axes of the diffraction figure of a sub-pupil are offset relative to the preferential axes of the diffraction figures of neighbouring sub-pupils, thereby enabling to limit the overlapping of the diffraction figures.

According to a preferential embodiment, the sub-pupils are rectangular or square in shape, substantially identical, arranged in the form of a two-dimensional matrix, and exhibit such an orientation relative to the directions of the matrix that the preferential axes of the diffraction figures of the sub-pupils in the diffraction plane are substantially parallel, not confused.

The invention enables to realise thus a wavefront analysis device, of Hartman type as well as of Shack-Hartmann type, whereof the resolution is enhanced, while enabling to use sub-pupils used conventionally, without any specific apodisation components.

Figure 3:
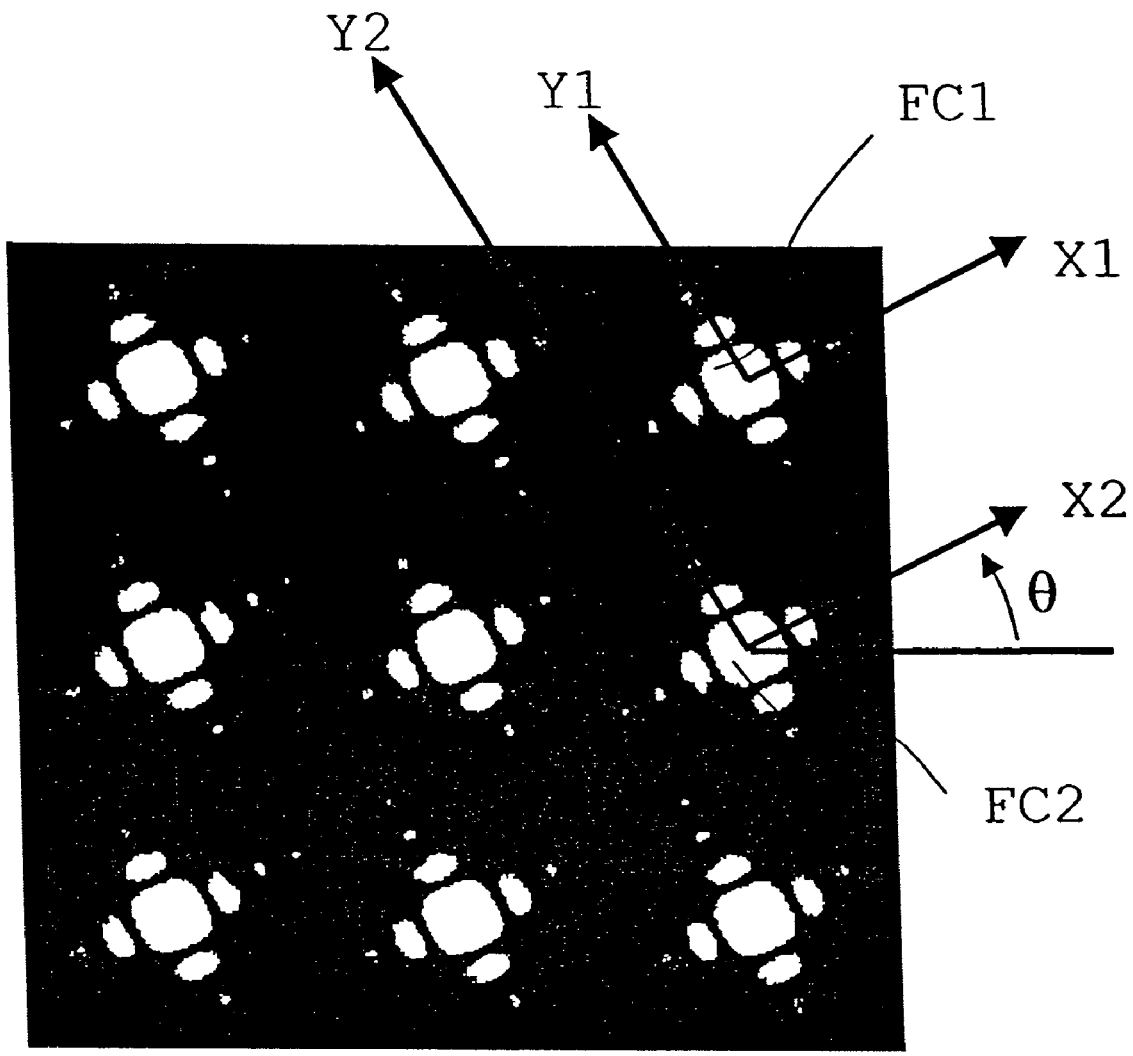

Other advantages and characteristics of the invention will appear more clearly in the light of the following description, illustrated by the appended figures which represent:

on FIGS. 1A to 1D, round and square sub-pupil diagrams as well as their corresponding diffraction figures, on FIG. 2, the diagram of a matrix arrangement of rotated square sub-pupils, according to an embodiment of the device according to the invention, on FIG. 3, a diagram of the diffraction figures issued from square sub-pupils rotated by an angle enabling to reduce substantially the overlapping phenomenon, on FIGS. 4A and 4B, curves exhibiting the variation of the error in measuring the positions of the spots due to the overlapping phenomenon relative to the displacement of the central spot, which for the 3 types of sub-pupils studied: square, square rotated by an angle taken at 25°, round, for lateral and diagonal displacement, on FIGS. 5A and 5B, error variation curves on the measurement of the positions of the spots due to the overlapping phenomenon relative to the displacement of the central spot, for a matrix of rotated square sub-pupils, namely for different spacing values between sub-pupils at constant aperture.

An essential point of the wavefront analysis by the Hartmann or Shack-Hartmann methods is the very accurate localisation in the diffraction plane of the positions of the focussing points issued from the sampling elements (micro-lenses or holes), when assuming prior correct sizing. Later on in the description, by wavefront analysis plane is meant the plane wherein are arranged the sampling elements and diffraction plane, the plane of the diffraction spots, corresponding to the diffraction plane when using micro-lenses.

FIGS. 1A to 1D illustrate the shapes of the sampling elements used conventionally as well as the aspects of the corresponding diffraction figures.

The Airy spot, noted FR, represented schematically on FIG. 1C, corresponds to the diffraction figure, in the diffraction plane, of the round sub-pupil noted R, represented schematically on FIG. 1A, and extends in an isotropic fashion.

The diffraction figure noted FC, represented schematically on FIG. 1D, corresponds to the diffraction figure, in the diffraction plane, of the square pupil noted C represented schematically on FIG. 1B and extends along 2 perpendicular directions, noted X and Y on the diagram, corresponding to both axes of the pupil.

The matrix arrangement of the elements described previously involves the overlapping of the diffraction figures at the diffraction plane, since for the round pupil, the spot spread is isotropic and for the square pupil, the matrix arrangement merges the axes of the neighbouring diffraction figures.

Localising the spots, by calculating the gravity centre, is consequently rendered inaccurate, in particular during the displacement of one of the spots: a portion of the diffraction figure corresponding to one of the spots overlaps the neighbouring spot and involves fictitious displacement of the gravity centres of said spots.

The device according to the invention enables maximum reduction of such effect.

According to the invention indeed, the shape of each sub-pupil is such that the associated diffraction figure exhibits in the diffraction plane one or several preferential axes, and the sub-pupils are oriented in the analysis plane so that, the set of the sub-pupils being illuminated by a plane incident wavefront, the diffraction figure of a sub-pupil in said diffraction plane does not overlap substantially the diffraction figures issued from the neighbouring sub-pupils. In other words, the sub-pupils are oriented in the analysis plane so that the preferential axes of the diffraction figure of a sub-pupil are offset with respect to the preferential axes of the diffraction figures of the neighbouring sub-pupils.

FIG. 2 illustrates an example of arrangement of the sub-pupils in a device according to the invention. The sub-pupils noted C in the example of FIG. 2 are selected substantially identical, square in shape, which is one of the shapes most commonly used in the Hartmann and Shack-Hartmann type wavefront analysis devices. Such sub-pupils exhibit the following advantages:

they are easy to produce,
the associated diffraction figures exhibit preferential diffraction axes.

In the example of FIG. 2, the sub-pupils are moreover arranged in the form of a square matrix, matrix defined by these perpendicular axes $X_{mat}$ and $Y_{mat}$. In this example, each of the sub-pupils, noted FC, is rotated by angle $\theta$ relative to one of the axes of the matrix, which we shall consider as Xmat for the example, as represented diagrammatically on FIG. 2.

FIG. 3 represents in the diffraction plane, the profile of the diffraction spots corresponding to the sub-pupils of FIG. 2. This arrangement enables, as represented diagrammatically on FIG. 3, to offset the preferential spreading axes of the diffraction figures due to each sub-pupil, and to minimise geometrically the overlapping phenomenon. Let us consider on the diagram of FIG. 3 the example of two diffraction figures noted FC1 and FC2 issued from two neighbouring sub-pupils. The preferential spreading axes of these figures are noted respectively X1, Y1 and X2, Y2. The rotation performed enables to offset the axes X1 and X2, Y1 and Y2 which were 2 by 2 confused in the case of non-rotated square sub-pupils. The angle of rotation noted $\theta$ of each sub-pupil is selected so that the diffraction figures of two neighbouring sub-pupils do not interfere substantially.

In order to quantify the effects of the overlapping phenomenon on the positioning accuracy of the spots, we have simulated the diffraction of a grid of micro-lenses, containing 5 by 5-sub-pupils arranged into a square matrix, with a 670 nm wavelength, by addition in amplitude diffraction figures issued from each micro-lens taken separately. This simulation renders possible the selection of the shape of the microlenses (square, round, rotated square), of their size, of their aperture as defined hereunder, of the displacement of the image spot issued form a selected micro-lens, that we take here as being the central micro-lens of the matrix in order to quantify the effect of its displacement over the largest zone possible. Simulation would be easily transposable to the case of the Hartmann method since the diffraction figures issued from micro-lenses or holes identical in shape are substantially equivalent.

A tilting angle of the sub-pupils is selected so that the overlapping phenomenon of the neighbouring diffraction figures is minimal. This angle depends on the distribution geometry of the sub-pupils: in the case of a symmetrical geometry as is the case for our example, the value of the angle is taken at 25°, enabling to offset at best the distribution axes of the diffraction figures therebetween.

This simulation is carried out with a view to avoid any artefact associated with the sampling: modelling operations are oversampled, while taking at least 100 samples per sub-pupil.

The aperture of the elementary analysis zone, i.e. the sub-pupil, is a significant parameter of the system sizing. This parameter is defined as the ratio of the focal distance of the micro-lenses to the size of the corresponding sub-pupil. For the simulations performed, we consider a 33-aperture, the best compromise between too wide an aperture which would consequently increase the size of the diffraction spots and hence the overlapping between neighbouring spots, and too narrow an aperture which would consequently reduce excessively the size of the spots and render too inaccurate a calculation of barycenter after integration by a CCD-type sensor.

Thresholding is set to 10% before calculation of the gravity centre of each spot, in order to simulate at best the thresholding carried out efficiently when detecting the spots by a CCD-type sensor, for instance, to break free from the detection noise.

We simulate the displacement of the image spot issued from the sub-pupil from the centre of this 5×5-matrix, by adding a tilting angle known on the incident phase of the wavefront taken locally at this central sub-pupil. The calculation of the barycenter on each of the spots issued from the matrix enables us to trace the position of each of these spots after known displacement of the central spot. It is therefore possible to calculate the error due to the overlapping phenomenon on the position of each of the spots.

We select a displacement dynamic of the central spot corresponding to a 20 μm maximum displacement, which corresponds, for the selected sizing, to a local phase variation at a sub-pupil of approximately the wavelength of the simulated beam, a significant variation and containing the most part of the measurements made in wavefront analysis.

Finally, we simulate two types of displacements of the central spot: lateral displacement according to one of the two distribution axes of the sub-pupils on the matrix, diagonal displacement by equal and simultaneous displacement according each of both axes. Taking into account the distribution symmetry of the sub-pupils both these types of displacement enable to give an accurate indication of the errors generated, due to the overlapping phenomenon, by any type of displacement in the dynamic selected above.

The calculation by barycenter of the position of the image spots after displacement of the central spot enables to define a global quality criterion for the measuring accuracy of the positions of the spots, i.e. the variance, noted V, calculated from the errors on the position of the main spots by calculation of the barycenter after displacement of the central spot. The variance corresponds thus to the sum of the squares of errors due to the overlapping phenomenon on the calculation of gravity centre of the position of each spot. We shall note as main spots the neighbouring focalisation spots of the displaced spot which are subjected to the largest influence of the overlapping phenomenon of the diffraction figures as regards the calculation of their position.

Rapid examination of the values of barycenter enables to identify these main spots as follows:
the central spot displaced
the four spots directly surrounding the central spot and situated on either side thereof along both main axes of the matrix.

FIG. 4 shows the evolution of the variance V defined above with the displacement of the central spot, namely for the three types of pupil considered: square, square rotate by a selected angle in order to minimise the overlapping phenomenon, round. FIG. 4A illustrates this evolution relative to lateral displacement of the central spot, FIG. 4B relative to a diagonal displacement of the same spot.

It can be noted thus that the geometrical arrangement performed enables to improve the accuracy for calculating the positions of the spots with respect to the shapes and dispositions of sub-pupils used henceforth, by a factor which may reach a 10-factor on the variance with respect to a matrix of non-rotated square sub-pupils.

A second simulation enables to visualise the improvement in resolution of a Shack-Hartmann (or Hartmann) type device according to the invention. To do so, a matrix of rotated square sub-pupils is considered according to the method here developed, the spacing between the sub-pupils forming the analysis matrix is reduced, while modifying the focal distance in order always to keep the same aperture.

FIG. 5 enables to quantify the evolution of the variance V defined above relative to the displacement of the central spot, for different values of the increase percentage in the resolution, noted $G_{res}$, gain corresponding to the reduction percentage of the spacing between the sub-pupils. FIG. 5A shows the results of this simulation for a lateral displacement, noted dx, of the central spot. FIG. 5B shows the results for a diagonal displacement, noted dx=dy of the same spot.

We wish to quantify the increase in resolution that may be reached thanks to the device according to the invention while keeping the same performances on the calculation of the position of the spots as a system which would use a conventional matrix of sub-pupils.

The comparison of FIGS. 4A and 5A, 4B and 5B, enables to show that it is possible to improve the resolution of the Hartmann or Shack-Hartmann wavefront analysis device while keeping the same 33%-measuring accuracy of the position of the spots with respect to a conventional matrix of square sub-pupils, to 27% with respect to a matrix of round sub-pupils.

The embodiment example described previously is not limiting. Notably, other shapes of sub-pupils may be used in the device according to the invention and other arrangements of the sub-pupils are possible as long as the diffraction figures corresponding to the sub-pupils exhibit one or two preferential axes and as, in relation to the shapes selected, the sub-pupils are arranged in the analysis plane so that the preferential axes of the diffraction figures are offset relative to one another in order to reduce the overlapping between the diffraction figures.

Thus, thanks to the device according to the invention, it is possible to increase the number of micro-lenses or holes per surface unit with respect to a matrix having a "conventional" geometrical arrangement of these micro-lenses or holes, while keeping the same accuracy for calculating the position of the diffraction spots generated by the matrix. Thus, the number of sampling spots of the Shack-Hartmann or Hartmann method is increased, and therefore its resolution.

The invention claimed is:

1. A device for analysing a wavefront, of the Hartman or Shack-Hartmann type, comprising in particular a set of sampling elements arranged in an analysis plane, and forming as many sub-pupils (C) for sampling the incident wavefront, and a diffraction plane wherein the diffraction spots of the different sub-pupils illuminated by the incident wavefront are analyzed, characterised in that the shape of each sub-pupil is such that the associated diffraction figure (FC) has in the diffraction plane one or several preferential axes (X1, Y1, X2, Y2), and in that the sub-pupils are oriented in the analysis plane so that the preferential axes of the diffraction figure of a sub-pupil are offset relative to the preferential axes of the diffraction figures of neighbouring sub-pupils, thereby enabling to limit the overlapping of the diffraction figures, wherein the device is of the Hartman or Shack-Hartmann type.

2. A device according to claim 1, characterised in that the sub-pupils are arranged in the analysis plane in the form of a two-dimensional matrix, the sub-pupils are parallelepipedal in shape, the diffraction figure of a sub-pupil having two preferential axes, and in that each sub-pupil is oriented with respect to the directions of the matrix so that the preferential axes of the diffraction figure of said sub-pupil show a non-zero angle with the two axes of the two-dimensional matrix.

3. A device according to claim 2, characterised in that the sub-pupils are substantially identical in shape, they show substantially the same orientation with respect to the two axes of the two-dimensional matrix so that the preferential axes of the diffraction figures are substantially parallel, not confused.

4. A device according to claim 2, characterised in that the sub-pupils are substantially rectangular in shape.

5. A device according to claim 4, characterised in that the sub-pupils are substantially square in shape.

6. A device according to claim 1, characterised in that the sub-pupils are arranged in the analysis plane in the form of a two-dimensional square matrix, in that the sub-pupils are square in shape, substantially identical, and in that each sub-pupil is oriented with respect to the two axes of the two-dimensional matrix by an angle θ, this angle θ having a value that is optimised to limit the overlapping of the diffraction figures.

7. A device according to claim 1, characterised in that the sampling elements are realised through apertures of predetermined shape, formed in an opaque screen.

8. A device according to claim 1, characterised in that the sampling elements are realised by micro-lenses associated with apertures of predetermined shape.

9. A device according to claim 2, characterised in that the sub-pupils are substantially rectangular in shape.

10. A device for analysing a wave front, comprising:
a set of sampling elements arranged in an analysis plane and forming sub-pupils (C) for sampling an incident wavefront; and
a diffraction plane wherein diffraction spots of different sub-pupils illuminated by the incident wavefront are analyzed, wherein,
the sub-pupils are arranged in the analysis plane in the form of a two-dimensional matrix,
each sub-pupil has an associated diffraction figure (FC) with two preferential axes (X1, Y1, X2, Y2),
the sub-pupils are oriented in the analysis plane so that the preferential axes of the associated diffraction figures are offset relative to the preferential axes of the diffraction figures of neighboring sub-pupils, limiting overlapping of the diffraction figures, the device is of a Hartman or Shack-Hartmann type, and each sub-pupil is oriented so that the two preferential axes of the diffraction figure of each sub-pupil show a non-zero angle with the two axes of the two-dimensional matrix.

11. A device according to claim 10, wherein, the sub-pupils are substantially identical in shape and show substantially the same orientation with respect to the two axes of the two-dimensional matrix.

12. A device according to claim 10, wherein, the sub-pupils are substantially rectangular in shape.

13. A device according to claim 10, wherein, the sub-pupils are substantially square in shape.

14. A device according to claim 10, wherein,
the sub-pupils are arranged in the analysis plane in the form of a two-dimensional square matrix, and
the sub-pupils are square in shape, substantially identical.

15. A device according to claim 10, wherein, the sampling elements are realised through apertures of predetermined shape, formed in an opaque screen.

16. A device according to claim 10, wherein, the sampling elements are realised by micro-lenses associated with apertures of predetermined shape.

17. A device according to claim 10, wherein, the sub-pupils are parallelepipedal in shape.

18. A device for analysing a wavefront, comprising:

sampling elements arranged in an analysis plane forming sub-pupils (C) for sampling an incident wavefront;

a diffraction plane wherein diffraction spots of different sub-pupils illuminated by the incident wavefront are analyzed, the sub-pupils arranged in the analysis plane in the form of a two-dimensional matrix, each sub-pupil having an associated diffraction figure (FC) with two preferential axes (X1, Y1, X2, Y2), wherein, the sub-pupils are oriented in the analysis plane so that the preferential axes of the associated diffraction figures are offset parallel relative to the preferential axes of the diffraction figures of neighboring sub-pupils, limiting the overlapping of the diffraction figures, and the device is one of a Hartman type and a Shack-Hartmann type.

* * * * *